(12) United States Patent
Hui et al.

(10) Patent No.: US 9,020,008 B2
(45) Date of Patent: Apr. 28, 2015

(54) OVERLAYING INDEPENDENT UNICAST FREQUENCY HOPPING SCHEDULES WITH A COMMON BROADCAST SCHEDULE

(75) Inventors: Jonathan W. Hui, Foster City, CA (US); Wei Hong, Berkeley, CA (US); Lik Chuen Alec Woo, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 13/180,976

(22) Filed: Jul. 12, 2011

(65) Prior Publication Data

US 2013/0016758 A1    Jan. 17, 2013

(51) Int. Cl.
| | |
|---|---|
| *H04B 1/00* | (2006.01) |
| *H04W 72/00* | (2009.01) |
| *H04W 72/12* | (2009.01) |
| *H04W 84/12* | (2009.01) |
| *H04W 84/18* | (2009.01) |

(52) U.S. Cl.
    CPC ........ *H04W 72/005* (2013.01); *H04W 72/1257* (2013.01); *H04W 84/12* (2013.01); *H04W 84/18* (2013.01)

(58) Field of Classification Search
    CPC ... H04W 4/06; H04W 27/2602; H04W 84/18; H04W 92/10
    USPC .......... 375/132, 133, 134, 136; 370/329, 428, 370/252
    See application file for complete search history.

(56) References Cited

U.S. PATENT DOCUMENTS

| | | | |
|---|---|---|---|
| 6,795,426 B1 | 9/2004 | Raleigh et al. | |
| 7,190,686 B1 | 3/2007 | Beals | |
| 7,483,444 B2 | 1/2009 | Raleigh et al. | |
| 7,706,741 B2 | 4/2010 | Patel et al. | |
| 7,751,396 B2* | 7/2010 | Kakani | 370/390 |
| 7,787,361 B2 | 8/2010 | Rahman et al. | |
| 1,007,570 A1 | 3/2011 | Bettendorff at al. | |
| 2004/0054774 A1* | 3/2004 | Barber et al. | 709/224 |
| 2005/0123141 A1* | 6/2005 | Suzuki | 380/277 |
| 2007/0248037 A1* | 10/2007 | Stewart et al. | 370/328 |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

(Continued)

*Primary Examiner* — Shuwang Liu
*Assistant Examiner* — Sung Ahn
(74) *Attorney, Agent, or Firm* — Parker Ibrahim & Berg LLC; James M. Behmke; Stephen D. LeBarron

(57) ABSTRACT

In one embodiment, each device in a frequency hopping communication network independently determines its own local unicast listening schedule, and discovers a neighbor unicast listening schedule for each of its neighbors. The devices also synchronize to a common broadcast schedule for the network that simultaneously overlays a configured portion of all unicast listening schedules in the network. Accordingly, the device operate in a receive mode according to their local unicast listening schedule and the common broadcast schedule during the overlaid configured portion, and in a transmit mode according to each neighbor unicast listening schedule and the common broadcast schedule during the overlaid configured portion depending upon a destination of transmitted traffic.

23 Claims, 9 Drawing Sheets

(56) References Cited

U.S. PATENT DOCUMENTS

| | | |
|---|---|---|
| 2008/0032744 A1* | 2/2008 | Khan et al. ............... 455/562.1 |
| 2008/0075010 A1* | 3/2008 | Song ........................... 370/238 |
| 2008/0175264 A1* | 7/2008 | Qu et al. ..................... 370/436 |
| 2010/0067374 A1 | 3/2010 | Elangovan et al. |
| 2011/0075704 A1* | 3/2011 | Bettendorff et al. ......... 375/133 |

OTHER PUBLICATIONS

Cipolla, et al., "Notification of Transmittal of the International Search Report and the Written Opinion of the International Searching Authority, or the Declaration", Patent Cooperation Treaty, Oct. 23, 2012, 14 pages, PCT/US2012/046204, European Patent Office, Rijswijk, Netherlands.

Khosrowshahi, et al., "A Novel Multi Channel Sensor Network MAC Protocol", Fourth International Conference on Systems and Networks Communications, Sep. 2009, pp. 230-235, IEEE, Piscataway, NJ.

Patel, et al., "A Cross-Layer Architecture to Exploit Multi-Channel Diversity with a Single Transceiver", Infocom 2007, 26th IEEE International Conference on Computer Communications, May 2007, pp. 2261-2265, IEEE, Piscataway, NJ.

Stine, et al., "A Paradigm for Quality-of-Service in Wireless Ad hoc Networks Using Synchronous Signaling and Node States", IEEE Journal on Selected Areas in Communications, vol. 22, No. 7, Sep. 2004, pp. 1301-1321, IEEE, Piscataway, NJ.

* cited by examiner

INDEPENDENT LISTENING
SCHEDULES/SEQUENCES
300

OVERLAYING INDEPENDENT UNICAST FREQUENCY HOPPING SCHEDULES WITH A COMMON BROADCAST SCHEDULE

TECHNICAL FIELD

The present disclosure relates generally to wireless communication, and, more particularly, to unicast and broadcast schedules in frequency hopping wireless networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time.

Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Existing systems optimize for both unicast and broadcast communication by synchronizing the entire network to the same channel-switching schedule and using a central coordinator to compute and configure channel schedules for each individual device. However, this method adds significant delay and communication overhead to coordinate new schedules between each transmitter-receiver pair.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates example independently determined and independently timed unicast frequency hopping sequences;

DESCRIPTION OF EXAMPLE EMBODIMENTS

Overview

Figure 1:
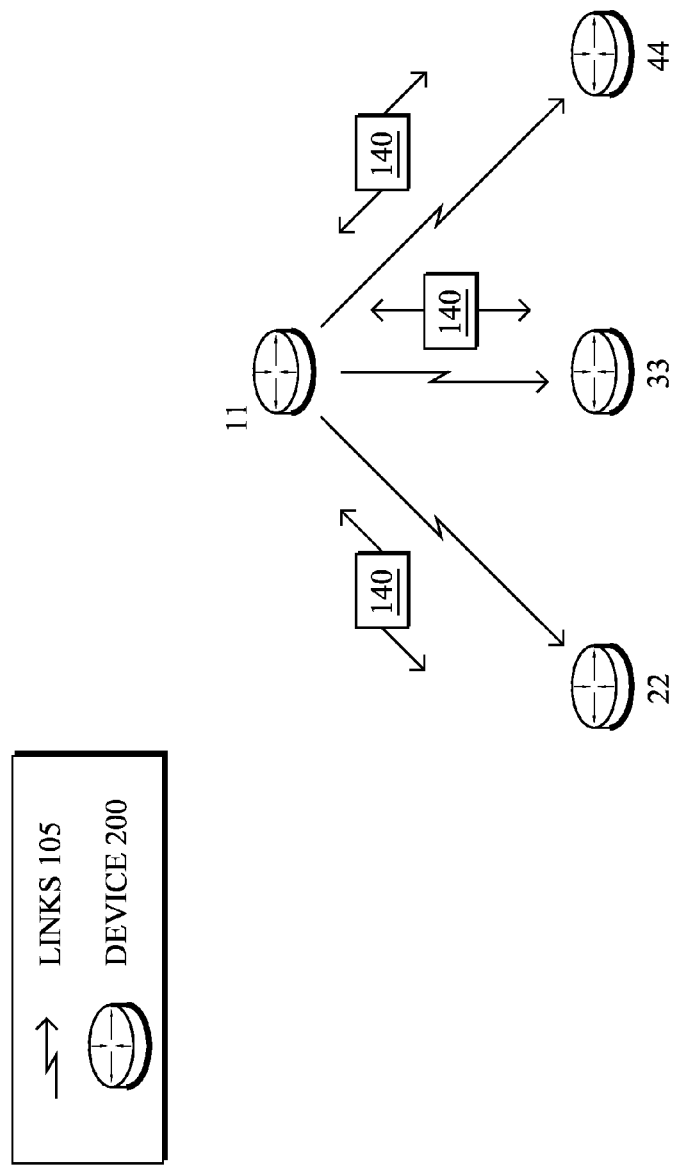
FIG. 1 illustrates an example wireless network.

According to one or more embodiments of the disclosure, each device in a frequency hopping communication network independently determines its own local unicast listening schedule, and discovers a neighbor unicast listening schedule for each of its neighbors. The devices also synchronize to a common broadcast schedule for the network that simultaneously overlays a configured portion of all unicast listening schedules in the network. Accordingly, the device operate in a receive mode according to their local unicast listening schedule and the common broadcast schedule during the overlaid configured portion, and in a transmit mode according to each neighbor unicast listening schedule and the common broadcast schedule during the overlaid configured portion depending upon a destination of transmitted traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
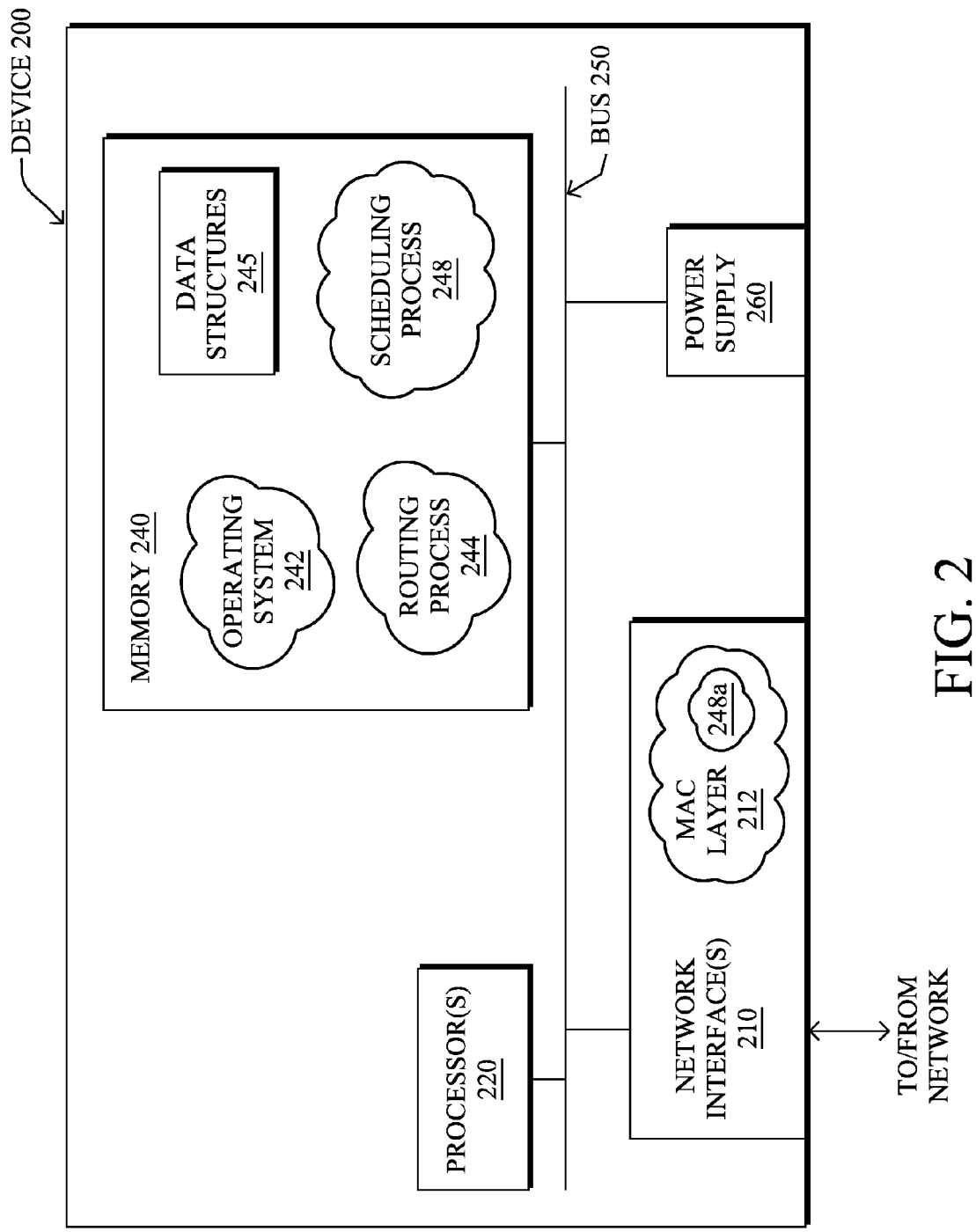
FIG. 2 illustrates an example wireless device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 248 as described in greater detail below. Note that while scheduling process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
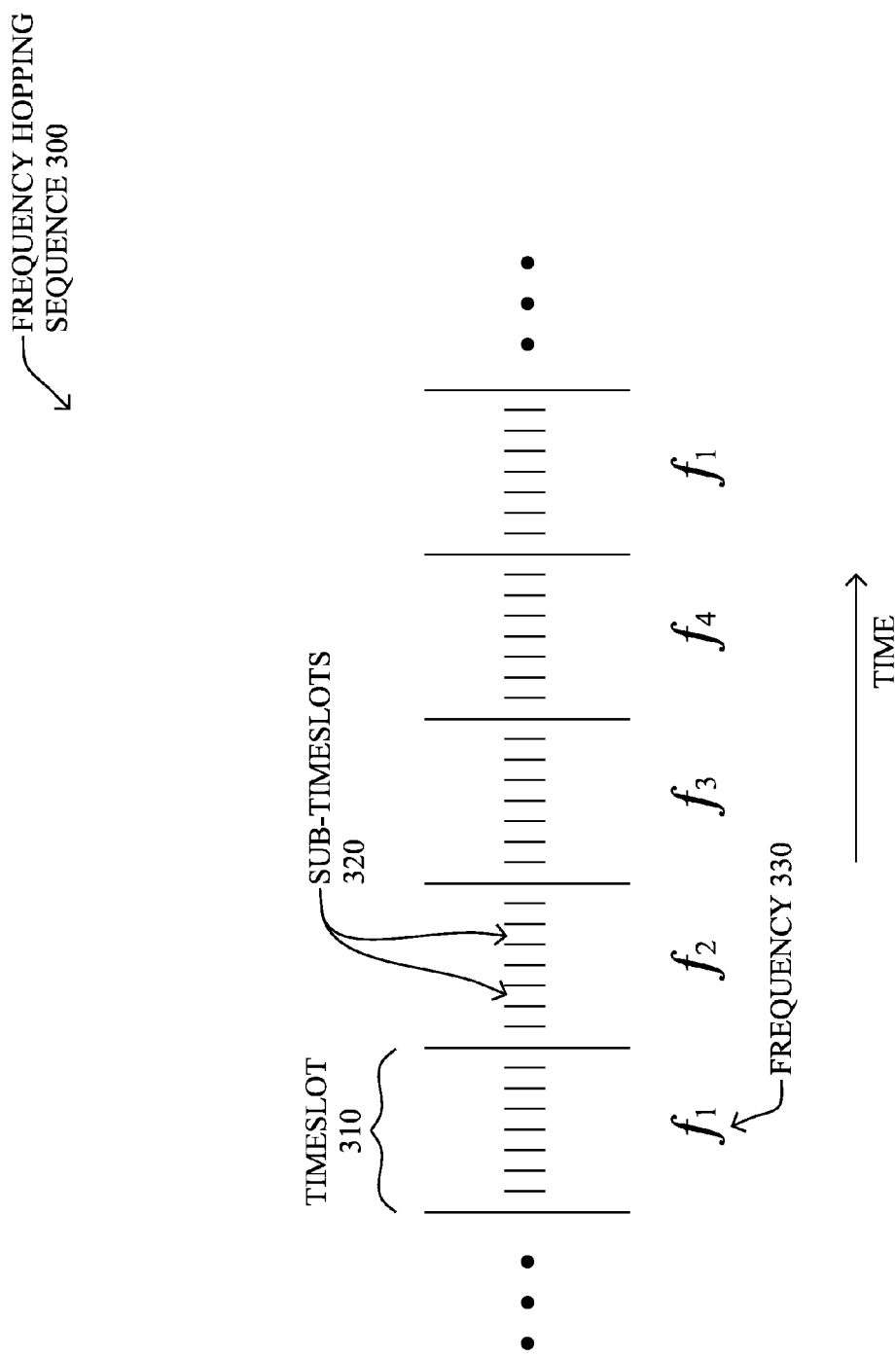
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4A:
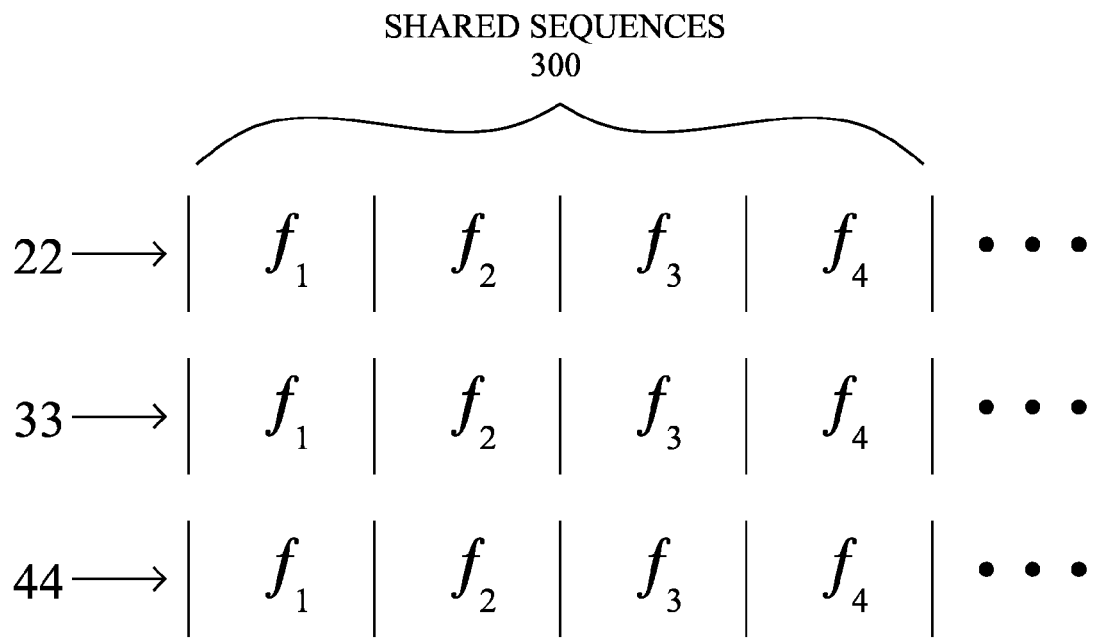
FIGS. 4A-4B illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (22, 33, and 44) are all configured with the same sequence (assume also that node 11 uses the same sequence).

Figure 4B:
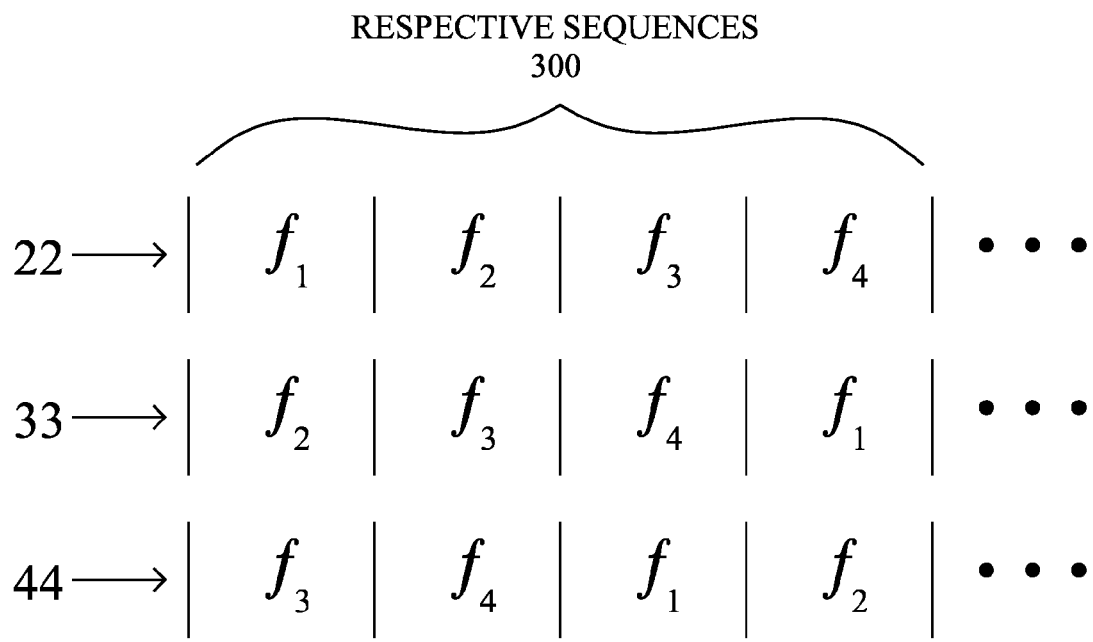

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Mesh networks typically utilize both unicast and broadcast communication. Applications use unicast communication to communicate data to a central server (e.g., AMI meter reads) or configure individual devices from a central server (e.g., AMI meter read schedules). Network control protocols use unicast communication to estimate the quality of a link (e.g., RSSI and ETX), request configuration information (e.g., DHCPv6), and propagate routing information (e.g., RPL DAO messages).

Applications use multicast communication for configuring entire groups efficiently (e.g., AMI meter configurations based on meter type), firmware download to upgrade (e.g., to upgrade AMI meter software to a newer version), and power outage notification. Network control protocols use multicast communication to discover neighbors (e.g., RPL DIO messages, DHCPv6 advertisements, and IPv6 Neighbor Solicitations) and disseminate routing information (e.g., RPL DIO messages).

Existing systems optimize for both unicast and broadcast communication by synchronizing the entire network to the same channel-switching schedule and using a central coordinator to compute and configure channel schedules for each individual device. For example, a first channel-hopping network may schedule all nodes to receive on the same channel at the same time, and the entire network hops together in lock-step. While this first network is optimized for broadcast, it does not allow frequency diversity for unicast where different pairs of nodes may communicate at the same time on different channels. In a second example network, both unicast and broadcast slots may be utilized, where a central gateway device computes the hopping schedule for each transmitter-receiver pair. However, this method adds significant delay and communication overhead to coordinate new schedules between each transmitter-receiver pair as the schedules are distributed using the wireless network. Each of these two example networks fail to optimize the schedule for both unicast and broadcast communication without the need for centrally computing schedules for individual nodes.

Optimizing Unicast and Broadcast Schedules

The techniques described herein introduce a channel-hopping concept that allow each device to determine its own listening schedule for unicast communication while synchronizing the entire network to a common schedule for broadcast communication. That is, the techniques allow different transmitter-receiver pairs to utilize different parts of the spectrum simultaneously for unicast communication but also synchronizes nodes to a network-wide broadcast schedule to support efficient broadcast communication.

Specifically, according to one or more embodiments of the disclosure as described in greater detail below, each device in a frequency hopping communication network independently determines its own local unicast listening schedule, and discovers a neighbor unicast listening schedule for each of its neighbors. The devices also synchronize to a common broadcast schedule for the network that simultaneously overlays a configured portion of all unicast listening schedules in the network. Accordingly, the device operate in a receive mode according to their local unicast listening schedule and the common broadcast schedule during the overlaid configured portion, and in a transmit mode according to each neighbor unicast listening schedule and the common broadcast schedule during the overlaid configured portion depending upon a destination of transmitted traffic.

Illustratively, the techniques described herein may be performed by hardware, software, and/or firmware, such as in accordance with scheduling process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

The techniques herein are generally premised on the following factors, as will be described in further detail below:
1) Having each device determine its own unicast schedule independent of all other devices,
2) Synchronizing the network to a common broadcast schedule that also indicates when devices listen for broadcast transmissions instead of unicast transmissions,
3) Transmitting unicast messages according to the listening schedules determined by the receiver, and
4) Transmitting broadcast messages according to the broadcast schedule.

Operationally, each node maintains its own channel-hopping schedule for receiving unicast messages, thus independently determining a "local unicast listening schedule" for each device. A unicast schedule is defined by the following parameters:
1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.
2) Slot Duration: the unicast schedule divides time into equal sized slots. A node listens to a single channel for the entire duration of a slot. At the beginning of each slot, the node switches to the next channel in the unicast schedule for listening. Note that as mentioned above, each independently determined unicast listening schedule can be independently timed, i.e., the slots (timeslots, sub-timeslots, etc.) need not align between different devices schedules.

FIG. 5 illustrates another example of independently determined local unicast listening schedules 300 that may be computed by each individual device in the network 100. Note how there is generally no overlap at any given time (a goal of the scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device may share their local unicast listening schedule with its neighbors, such that each device can correspondingly discovering a neighbor unicast listening schedule for each neighbor, accordingly. As mentioned above, a node includes information about its unicast schedule in various link frames (packets 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

According to the techniques herein, in addition to the unicast listening schedules, all nodes in the same network synchronize to a common broadcast schedule that simultaneously overlays a configured portion of all unicast listening schedules in the network. Note that there is generally no coordination of broadcast schedules between different networks. A broadcast schedule is defined by the following parameters:
1) Channel Sequence: a list of channels, e.g., indexed by a 16-bit integer, that a mesh interface follows when listening for broadcast transmissions. Each entry in the Channel Sequence may be determined by a function that takes a unique identifier of the network (e.g., an IEEE 802.15.4 personal area network or "PAN" ID) and the list index. Using the network ID helps ensure that neighboring networks (e.g., PANs) do not follow the same pseudo-random sequence and reduces the chance of repeated collisions by neighboring networks.
2) Slot Duration: the broadcast schedule divides time into equal sized slots. At the beginning of each slot, the node switches to the next channel in the broadcast schedule for listening.

Figure 6:
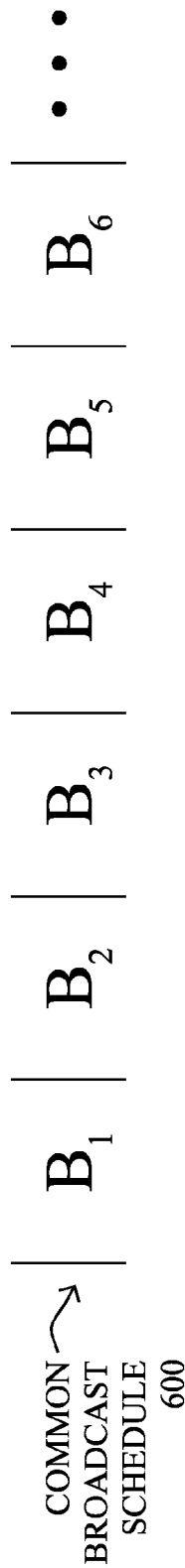
FIG. 6 illustrates an example broadcast frequency hopping sequence.

FIG. 6 illustrates an example broadcast schedule (sequence) 600, showing example frequencies $B_1$-$B_6$. All nodes in the network synchronize to only one broadcast schedule. The slot timing of broadcast slots in the common broadcast schedule may generally be independent of slot timing of unicast slots in the local unicast listening schedule. Note that while the broadcast schedule 600 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., an IEEE 802.15.4 PAN coordinator, Field Area Router, etc.) or automatically discovered (e.g., a smallest IEEE 802.15.4 IEEE EUI-64).

Figure 7A:
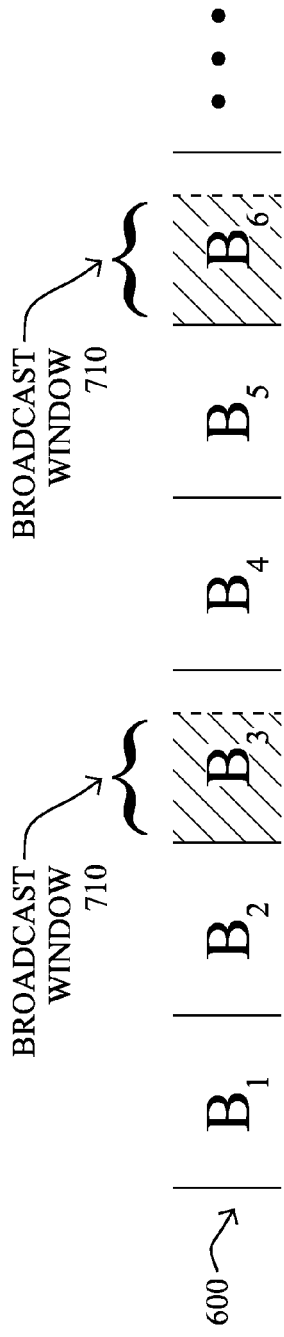
FIGS. 7A-7B illustrate an example overlay broadcast schedule.

In addition, a broadcast schedule is also defined by the following parameters:

3A) Broadcast Window: specifies how long a node listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

Figure 7B:
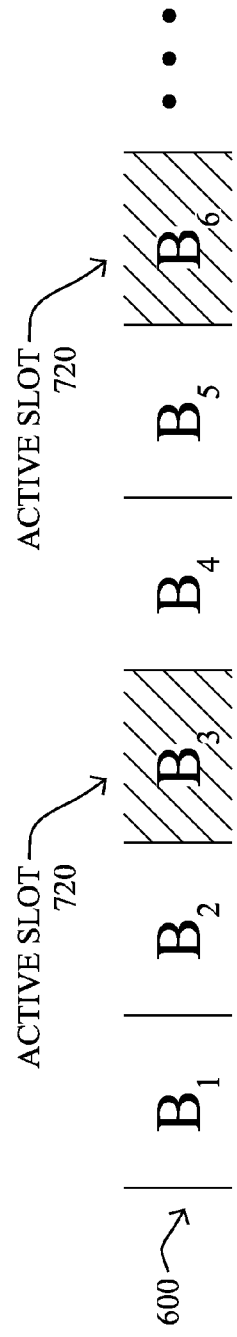

3B) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic.

According to the techniques herein, the common broadcast schedule 600 overlays each individual device's unicast listening schedule 300, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

Figure 8:
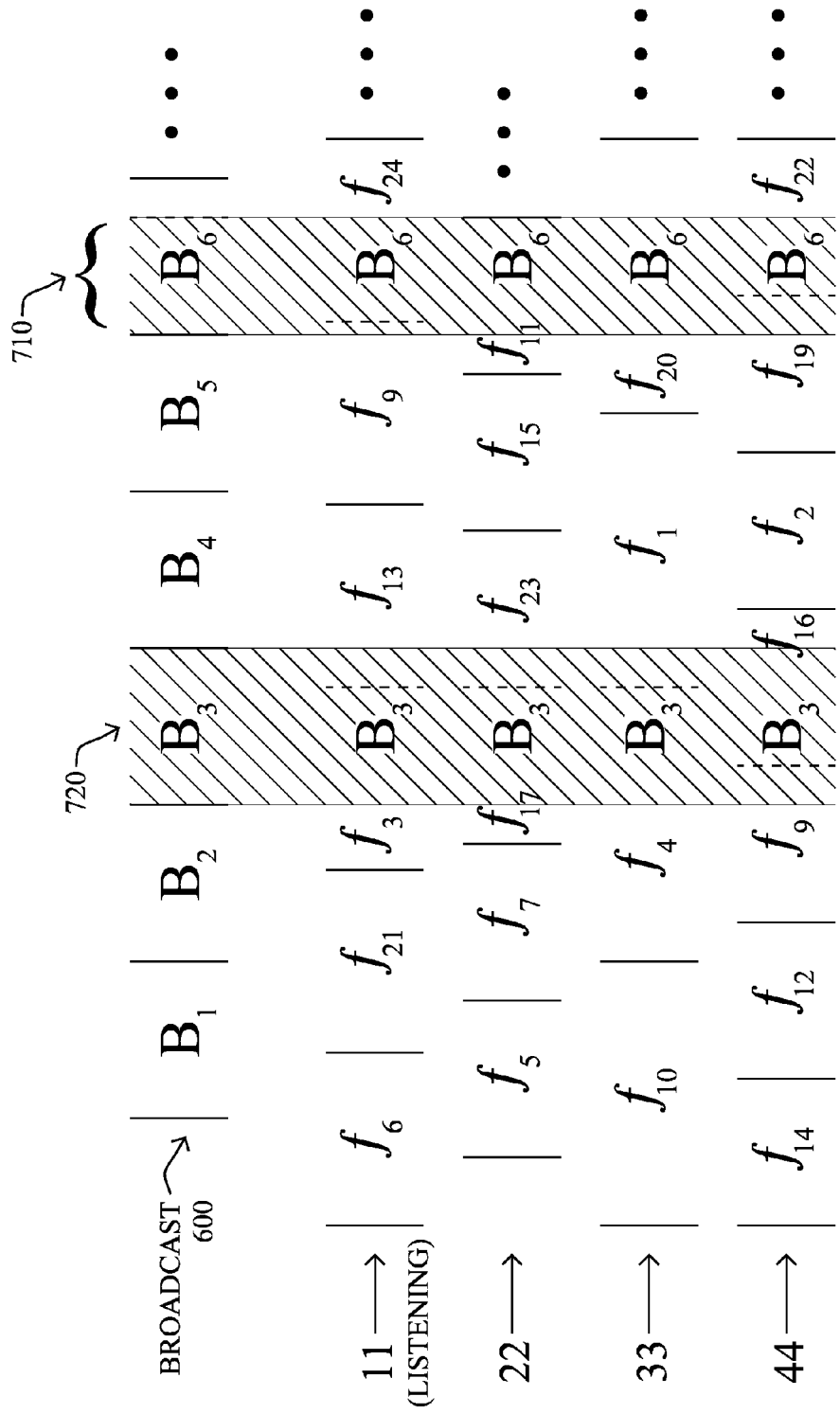
FIG. 8 illustrates an example of the broadcast schedule overlaid on the independent unicast sequences.

For example, FIG. 8 illustrates the overlay of the broadcast schedule 600 over the unicast listening schedules 300 of each device in the network. For instance, as can be seen, node 11 listens to its local unicast listening schedule unless the particular overlaid portion of the broadcast schedule dictates that node 11 listen on the broadcast channel at the time. Should node 11 wish to send a transmission to any of its neighbor nodes (22-44), node 11 uses the neighbor's listening schedule according to whether a unicast message or broadcast message is to be used. Note that in FIG. 8, the left side shows an active broadcast slot period 720, while the right side shows a broadcast window 710, though this is merely for illustration. Note further that a combination of slot period 720 and broadcast window 710 may be used, e.g., defining which particular slots of a broadcast schedule to use (period 720), and then further defining a length of time for each of those slots to use (window 710).

In particular, all unicast link frames are thus sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor.

Also, all broadcast link frames are thus also sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule.

Separating unicast and broadcast traffic is beneficial in cases where broadcast traffic is used for critical network control or application functions. However, the network may optionally be configured to allow transmission of unicast frames during a broadcast slot while the network is actively listening for broadcast transmissions. Doing so reduces communication delays and aggregate capacity for unicast traffic, but comes at the risk of interfering with broadcast traffic.

A synchronized transmission starts within the intended unicast or broadcast slot but does not need to end within the same slot. That is, a link frame transmission only utilizes a single channel and link frames are not fragmented across different channels. Once a node begins receiving a link frame, it will continue receiving the frame until the end of transmission.

Note further that synchronized transmissions should take into account any of the uncertainties in time synchronization. Such uncertainties may be due to frequency tolerances of nodes' clock sources and interrupt processing jitter when time stamping events. To account for these uncertainties, nodes do not begin transmissions near the start or end of a unicast slot or a broadcast listen window. Instead, nodes may schedule their transmissions outside of such guard windows.

Additionally, unicast transmissions typically request an acknowledgment. Acknowledgment frames may thus be sent using the same channel as the received frame being acknowledged. Utilizing the same channel for sending the acknowledgment removes the channel switch overhead on both the transmitter and receiver. Because acknowledgment frames are transmitted without a clear-channel assessment, the acknowledgment transmission may continue to use the same channel originally acquired by the frame being acknowledged.

Figure 9:
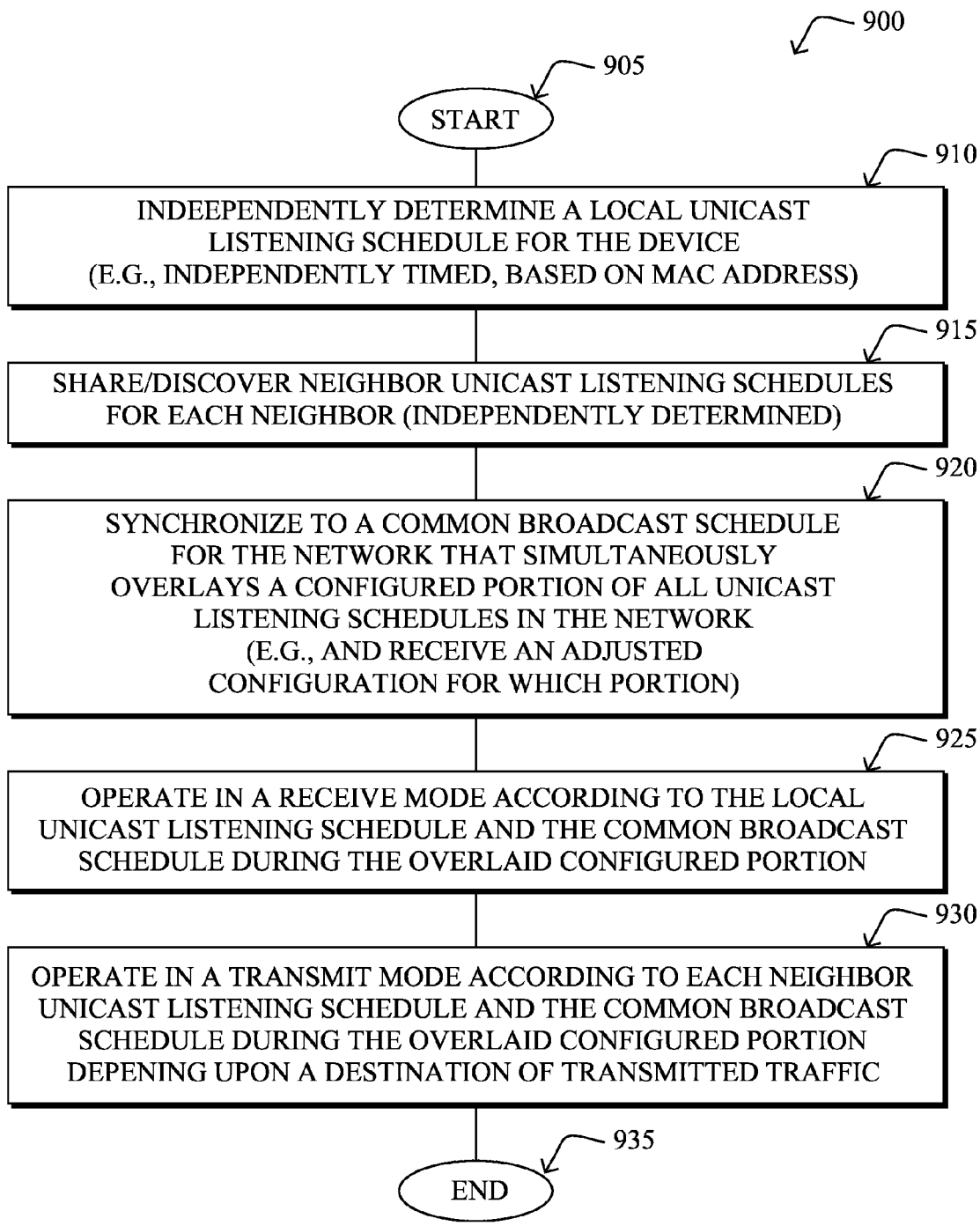
FIG. 9 illustrates an example simplified procedure for providing optimized unicast and broadcast schedules in frequency hopping computer networks, e.g., overlaying the common broadcast schedule over the independent unicast schedules.

FIG. 9 illustrates an example simplified procedure for providing optimized unicast and broadcast schedules in frequency hopping computer networks in accordance with one or more embodiments described herein, e.g., overlaying the common broadcast schedule over the independent unicast schedules. The procedure 900 starts at step 905, and continues to step 910, where, as described in detail above, a device independently determines its local unicast listening schedule (sequence 300). For example, as mentioned above, the local unicast listening schedule can be independently timed (where the slots don't need to line up with neighbors' slots), and may be based on a MAC address or other unique ID of the device to avoid overlap with other nearby devices. In step 915, the neighbor unicast listening schedules for each neighbor (independently determined) may be shared to and discovered from the device's neighbors. Further, in step 920, the device synchronizes to a common broadcast schedule 600 for the network that simultaneously overlays a configured portion of all unicast listening schedules in the network, e.g., as shown above in FIG. 8. Note that as described above, the actual broadcast portions may be adjusted through received configurations, such as to extend or reduce a broadcast window, increase or decrease a number of broadcast slots, etc.

In step 925, the device operates in a receive mode according to the local unicast listening schedule and the common broadcast schedule during the overlaid configured portion, as described in detail above. For instance, the device listens to the network for unicast traffic based on its local unicast listening schedule, unless it is during a portion of the schedule that is overlaid by the broadcast schedule, at which time the device listens for broadcast traffic. Also, for any transmissions to be sent from the device, in step 930 the device may correspondingly operate in a transmit mode. The transmit mode operates according to each neighbor unicast listening schedule and the common broadcast schedule during the overlaid configured portion depending upon a destination of transmitted traffic. As illustrated above, for instance, if node 11 is to transmit a unicast packet to node 22, node 11 determines the appropriate frequency/channel based on node 22's neighbor listening schedule at the time the transmission is to occur, and then transmits the unicast packet, accordingly. If node 11 has a broadcast packet to transmit, then it may wait (if necessary) for a next broadcast window/slot, and transmits the broadcast packet at the specified broadcast frequency.

The procedure 900 ends in step 935, notably with the ability to update unicast and/or broadcast schedules, to receive messages, and/or to transmit messages in any of the corresponding steps outlined above. It should also be noted that certain steps within procedure 900 may be optional, and the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for optimized unicast and broadcast schedules in a frequency hopping network. By overlaying independent unicast schedules with a common broadcast schedule, a system in accordance with the techniques herein:

1) Increase aggregate network capacity for unicast communication by utilizing independent channel-hopping schedules.
2) Reduce the likelihood of repeated unicast collisions between neighboring transmitter-receiver pairs by using a pseudo-random function that takes the MAC address as a parameter.
3) Increase efficiency of broadcast communication by synchronizing all nodes to a common broadcast schedule.
4) Reduce the likelihood of repeated broadcast collisions between neighboring networks by using a pseudo-random function that takes the network ID as a parameter.
5) Optionally allow unicast traffic during broadcast slots to increase aggregate unicast capacity at the cost of increased collisions with broadcast traffic.
6) Allow devices to maintain their own unicast schedule independent of other devices and the broadcast schedule, leading to simpler configuration and management.
7) Allow the broadcast schedule to be maintained independently of the unicast schedule, allowing the broadcast schedule to be reconfigured for changes in the distribution between unicast and broadcast communication.
8) Allow each transmitter-receiver pair to maintain their own synchronization independently, limiting the scope of any synchronization errors to the transmitter-receiver pair.

While there have been shown and described illustrative embodiments that provide for optimized unicast and broadcast schedules in a frequency hopping network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description is specifically discussed synchronized transmissions, it is possible to allow for various unsynchronized transmissions when it is desirable to do so.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

independently determining, by a device in a frequency hopping communication network, a local unicast listening schedule for the device, wherein the local unicast listening schedule is maintained on the device;

discovering a neighbor unicast listening schedule for each of one or more neighbors of the device in the network, each neighbor unicast listening schedule independently determined by a corresponding neighbor, wherein each neighbor locally maintains its neighbor unicast listening schedule;

synchronizing the device to a common broadcast schedule for the network that simultaneously overlays a configured portion of all unicast listening schedules in the network;

operating in a receive mode according to the local unicast listening schedule and the common broadcast schedule during the overlaid configured portion; and operating in a transmit mode according to each neighbor unicast listening schedule and the common broadcast schedule during the overlaid configured portion depending upon a destination of transmitted traffic.

2. The method as in claim 1, wherein each independently determined local unicast listening schedule is independently timed.

3. The method as in claim 1, wherein slot timing of broadcast slots in the common broadcast schedule are independent of slot timing of unicast slots in the local unicast listening schedule.

4. The method as in claim 1, wherein independently determining the local unicast listening schedule comprises:
basing the local unicast listening schedule on a unique identifier of the device.

5. The method as in claim 1, wherein the common broadcast schedule is based on a unique identifier of the network.

6. The method as in claim 1, wherein operating in transmit mode comprises:
transmitting a unicast message to a particular neighbor during a unicast slot based on the corresponding neighbor unicast listening schedule for the particular neighbor.

7. The method as in claim 1, wherein operating in transmit mode comprises:
transmitting a unicast message to a particular neighbor during a broadcast slot based on the common broadcast schedule.

8. The method as in claim 1, wherein operating in transmit mode comprises:
transmitting a broadcast message into the network during a broadcast slot based on the common broadcast schedule.

9. The method as in claim 1, wherein operating in receive mode comprises:
sharing the local unicast listening schedule with the one or more neighbors; and
listening for transmissions based on the local unicast listening schedule and based on the common broadcast schedule during the overlaid configured portion.

10. The method as in claim 1, wherein the overlaid configured portion is based on a broadcast window during which the common broadcast schedule is to be used.

11. The method as in claim 10, further comprising:
receiving an adjusted configuration for the broadcast window.

12. The method as in claim 1, wherein the overlaid configured portion is based on a particular set of broadcast slots of the common broadcast schedule during which the common broadcast schedule is to be used.

13. The method as in claim 10, further comprising:
receiving an adjusted configuration for the particular set of broadcast slots.

14. An apparatus, comprising:
a processor;
a transceiver configured to communicate in a frequency hopping communication network; and
a memory configured to store a process executable by the processor, the process when executed by the processor operable to:

independently determine a local unicast listening schedule for the apparatus, wherein the local unicast listening schedule is maintained on the apparatus;

discover a neighbor unicast listening schedule for each of one or more neighbors of the apparatus in the network, each neighbor unicast listening schedule independently determined by a corresponding neighbor, wherein each neighbor locally maintains its neighbor unicast listening schedule;

synchronize to a common broadcast schedule for the network that simultaneously overlays a configured portion of all unicast listening schedules in the network;

operate in a receive mode according to the local unicast listening schedule and the common broadcast schedule during the overlaid configured portion; and operate in a transmit mode according to each neighbor unicast listening schedule and the common broadcast schedule during the overlaid configured portion depending upon a destination of transmitted traffic.

15. The apparatus as in claim 14, wherein each independently determined local unicast listening schedule is independently timed.

16. The apparatus as in claim 14, wherein the process when executed to independently determine the local unicast listening schedule is further operable to:
basing the local unicast listening schedule on a unique identifier of the device.

17. The apparatus as in claim 14, wherein the process when executed is further operable to:
transmit a unicast message to a particular neighbor during a broadcast slot based on the common broadcast schedule during operation in the transmit mode.

18. The apparatus as in claim 14, wherein the process when executed is further operable to:
share the local unicast listening schedule with the one or more neighbors.

19. The apparatus as in claim 14, wherein the overlaid configured portion is based on a broadcast window during which the common broadcast schedule is to be used.

20. The apparatus as in claim 14, wherein the overlaid configured portion is based on a particular set of broadcast slots of the common broadcast schedule during which the common broadcast schedule is to be used.

21. The apparatus as in claim 14, wherein the process when executed is further operable to:
receive an adjusted configuration for the overlaid configured portion.

22. A tangible, non-transitory, computer-readable media having software encoded thereon, the software, when executed by a processor on a device in a frequency hopping communication network, operable to:
independently determine a local unicast listening schedule for the device, wherein in the local unicast listening schedule is maintained on the device;

discover a neighbor unicast listening schedule for each of one or more neighbors of the device in the network, each neighbor unicast listening schedule independently determined by a corresponding neighbor, wherein each neighbor locally maintains its neighbor unicast listening schedule;

synchronize the device to a common broadcast schedule for the network that simultaneously overlays a configured portion of all unicast listening schedules in the network;

operate in a receive mode according to the local unicast listening schedule and the common broadcast schedule during the overlaid configured portion; and operate in a transmit mode according to each neighbor unicast listening schedule and the common broadcast schedule during the overlaid configured portion depending upon a destination of transmitted traffic.

23. The computer-readable media as in claim 22, wherein each independently determined local unicast listening schedule is independently timed.

* * * * *